United States Patent
Agre et al.

(10) Patent No.: US 8,683,059 B2
(45) Date of Patent: Mar. 25, 2014

(54) METHOD, APPARATUS, AND COMPUTER PROGRAM PRODUCT FOR ENHANCING COMPUTER NETWORK SECURITY

(75) Inventors: Jonathan Russell Agre, Brinklow, MD (US); Jesus Molina-Terriza, Washington, DC (US); Lusheng Ji, Randolph, NJ (US); Prabha Ramachandran, Falls Church, VA (US)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 11/453,074

(22) Filed: Jun. 15, 2006

(65) Prior Publication Data

US 2007/0294416 A1 Dec. 20, 2007

(51) Int. Cl.
*G06F 15/16* (2006.01)
*G06F 15/173* (2006.01)

(52) U.S. Cl.
USPC ............................ 709/229; 709/225; 709/227

(58) Field of Classification Search
USPC ........................................................ 709/229
See application file for complete search history.

(56) References Cited

U.S. PATENT DOCUMENTS

| | | | | |
|---|---|---|---|---|
| 6,584,508 | B1 * | 6/2003 | Epstein et al. | 709/229 |
| 6,915,437 | B2 * | 7/2005 | Swander et al. | 726/1 |
| 2004/0167984 | A1 * | 8/2004 | Herrmann | 709/229 |
| 2005/0021838 | A1 * | 1/2005 | Levett | 709/238 |
| 2005/0091389 | A1 * | 4/2005 | Qi et al. | 709/229 |
| 2006/0168253 | A1 * | 7/2006 | Baba et al. | 709/229 |
| 2006/0209773 | A1 * | 9/2006 | Hundal et al. | 370/338 |
| 2007/0005782 | A1 * | 1/2007 | Zheng | 709/230 |

OTHER PUBLICATIONS

Jonathan Agre, "Ubiquitous Security," presentation at "Workshop on Personal and Institutional Security" in conjunction with MUMS 2004, by Fujitsu Laboratories of America, Oct. 27, 2004 (23 pages).

* cited by examiner

*Primary Examiner* — Shripal Khajuria
(74) *Attorney, Agent, or Firm* — Staas & Halsey LLP

(57) ABSTRACT

A security management approach that combines network security management with application layer or software service security to address the threat of internal network security attacks. The invention is directed to a method for enhancing network security on a computer network. Data access privileges relating to users and services are interpreted, network access rules are determined based on the interpreted privileges, and network message traffic is monitored and filtered based on the determined network access rules. The interpreting, determining, monitoring, and filtering are performed at a network layer responsible for controlling how a network device gains access to the network, such as the Media Access Control (MAC) layer.

26 Claims, 11 Drawing Sheets

Software modules in a CUS Switch

METHOD, APPARATUS, AND COMPUTER PROGRAM PRODUCT FOR ENHANCING COMPUTER NETWORK SECURITY

BACKGROUND OF THE INVENTION

Description of the Related Art

1. Field of the Invention

The present invention relates, generally, to network security, and more specifically, to a method for preventing or minimizing internal compromises to network security.

2. Description of the Related Art

Traditionally, the focus of network security has been on controlling the entrances and exits of an internal network utilizing firewalls on the perimeter of the network. Network administrators assume that rogue, malicious users/attackers originate outside their own networks. As there are typically only a manageable number of entrances and exits for an internal network, such approaches, based on Firewalls or Virtual Private Network methods, simplify security management, but can lead to significant security breaches in today's more technologically advanced world.

For example, the relatively new paradigm of ubiquitous computing, which is characterized by an omnipresent communication infrastructure, large number of users, large number of services, and anytime/anywhere access to the services regardless of the user locations and network attachment points, brings new challenges to network and service security.

The ubiquitous computing environment can exist in many different application domains such as homes, offices, shopping areas, factories, and hospitals. Such an environment will often consist of a large number of devices that contain embedded intelligence and the ability to communicate with each other, typically through wireless means. In the ubiquitous computing era, the fundamental assumption of an attack originating outside the network is no longer reasonable as the number of opportunities for an outsider to get onto an internal network drastically increases. The unreasonableness of such an assumption is evident, as more and more computer related crimes and security breaches are discovered to be emanating from attackers residing inside of a protected network. Such breaches are thought to be the work of insider's with legitimate network access or those who are often unwitting accomplices to the attacks.

As an example, local area network users are typically allowed network access to discover available services using web service discovery mechanisms such as UPnP, JINI, or Bluetooth SDP. As a result, it is possible for a user to exploit a network, even with such limited access for discovery.

In light of the foregoing, what is needed is a security management approach that combines network security management with application layer or software service security to address the threat of internal network security attacks.

SUMMARY OF THE INVENTION

The present invention is directed to a security management method and system that combine network security management with application layer or software service security to address the threat of internal network security attacks. Data access privileges relating to users and services are interpreted, network access rules are determined based on the interpreted privileges, and network message traffic is monitored and filtered based on the determined network access rules, according to at least one embodiment of the invention. The interpreting, determining, monitoring, and filtering are performed at a network layer responsible for controlling how a network device gains access to the network, such as the Media Access Control (MAC) layer.

BRIEF DESCRIPTION OF THE DRAWINGS

Aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
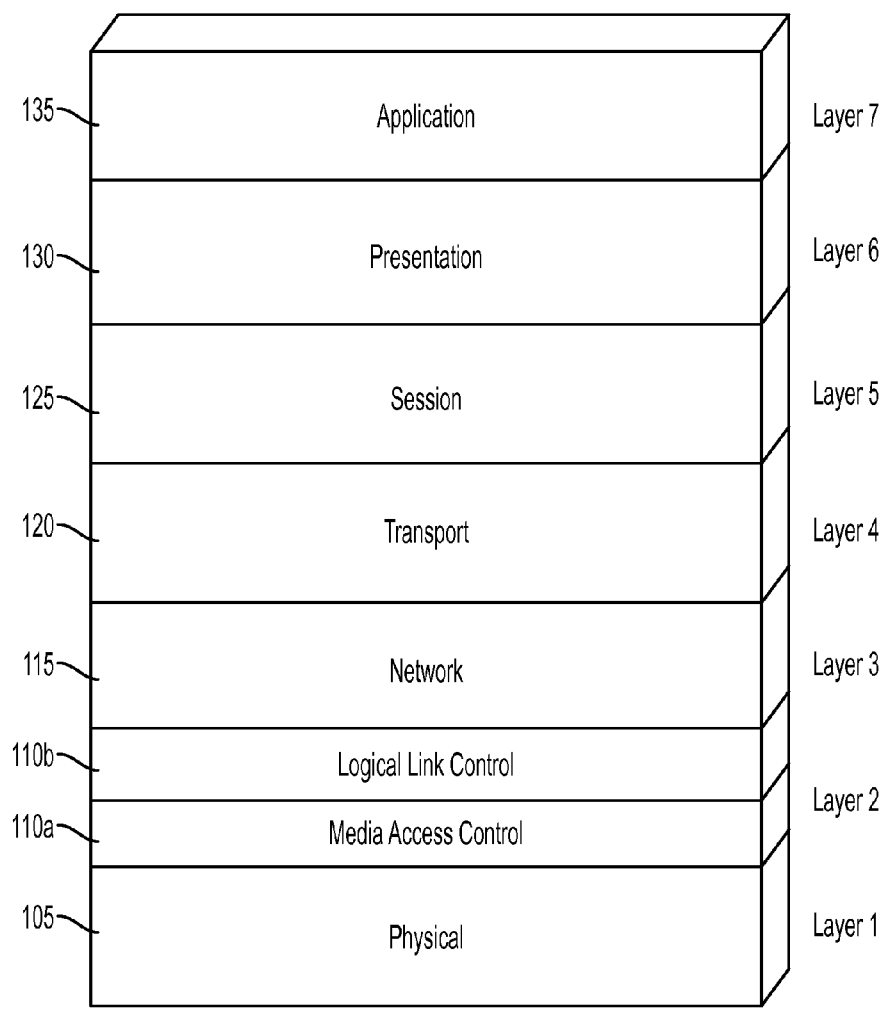
FIG. 1 is an illustration of various layers performing network functionality for a computer network on which the present invention can operate.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 illustrates the seven layers of computer network functionality according to at least one embodiment of the present invention.

Layer 105 represents the hardware or physical layer. The physical layer is the most basic network layer, providing only the means of transmitting raw bits. The shapes of electrical connectors, which frequencies to broadcast on, and similar low-level specifications are specified in the physical layer.

Media Access Control Layer 110a and Logical Link Control Layer 110b combine to form the Data Link Layer. The Data Link Layer provides the functional and procedural means to transfer data between network entities and might provide the means to detect and possibly correct errors that may occur in the Physical layer.

The Logical Link Control Layer 110b maintains a link between a first computer and a second computer, for example, by establishing a plurality of interface points, for example, Service Access Points (SAPs) according to IEEE 802.2, for example.

The Media Access Control (MAC) layer 110a coordinates the sending of data between computers. According to at least one embodiment of the present invention, at the Media Access Control layer 110a, network traffic is monitored and filtered based on determined network access rules. Network access rules are determined based on interpreting data access privileges relating to users and services, for example, as will be described in further detail herein below. As the network traffic is monitored and filtered at the low level, namely the Media Access Control (MAC) layer 110a, network security can be enhanced, as unauthorized access can be prevented or minimized earlier enough to prevent a possible breach in network security. Thus, in the present invention security is dynamically provided from both internal and external threats.

For example, if a network device attempts to connect to the network, in the present invention, traffic to or from such a device is monitored and filtered to determine whether the device is authorized to send or receive requested data, thereby preventing or minimizing an unauthorized device from "listening" on the network and eventually possibly gaining unauthorized access to the network from information gathered while "listening" at the Media Access Control (MAC) layer. For example, an unauthorized network device is prevented from sending information onto the network, thereby possibly preventing denial of service attacks due to sending large numbers of message that cause performance degradation of the network or targeted hosts.

Network Layer 115 represents the Internet Protocol (IP) network protocol layer and routes messages using the best path on the network that is available.

Transport Layer 120, for example, Transmission Control Protocol (TCP)/User Data Protocol (UDP) ensures that data transmission is properly sequenced and free of errors.

Session Layer 125 represents the user's interface to the network. Session Layer 125 determines when the session has begun, the duration of the session, and when the session has ended. The layer also controls the transmission of data during the session and supports security and name lookup, thereby enabling computers to locate each other.

Presentation Layer 130 is responsible for data syntax, for example, ASCII or EBCDEC data syntax and makes the type of data transparent to the layers around it, for example to translate data to computer specific format such as byte ordering. The layer prepares the data, either for the network or the application depending on the direction of travel.

Application Layer 135 provides services that software applications require and allows user applications to interact with the network. In at least one embodiment of the present invention, Application Layer 135 "talks" to the lower layers such as the Media Access Control Layer 105(b) to provide the Media Access Control Layer 105(b) with information relating to users and services, for example. As previously explained, the Media Access Control Layer 105(b) utilizes such information to monitor and filter network message traffic based on determined network access rules, as will be described in further detail herein below.

Figure 2:
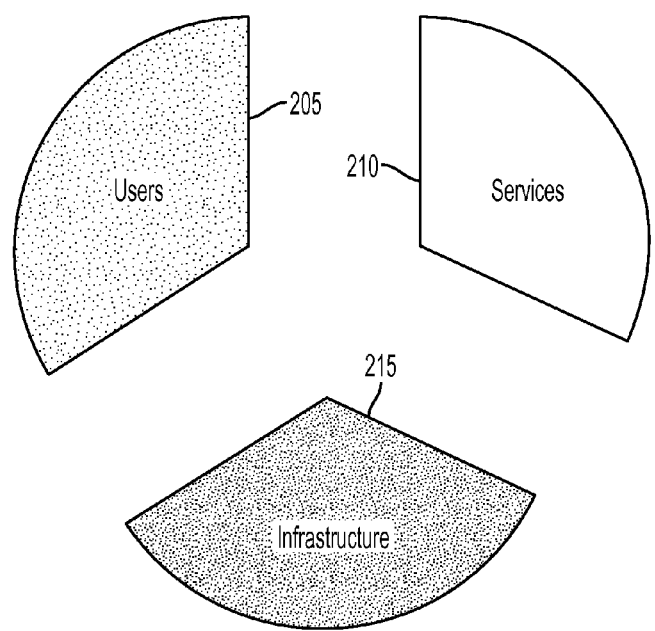
FIG. 2 is an illustration depicting some of the various entities that can be involved in the functionality of the present invention according to at least one embodiment.

As illustrated in FIG. 2, the present invention employs a three-tiered ubiquitous computer security architecture. In such an architecture, user devices and/or users 205, services provided to the users 205, and network infrastructure devices 215, collaborate to automatically accomplish security functions, such as authentication, authorization, configuration, monitoring, detection, isolation, and notification on a computer networking system according to at least one embodiment of the present invention.

In at least one embodiment of the invention, data pertaining to access privileges relating to users and services is accessed, and the data is incorporated into filtering rules enforced at a Media Access Control Layer.

In the above-described architecture, the network infrastructure, for example, the network interface cards, switches, hubs, routers, and wireless access points of a network, provide levels of communication security services based on information provided by the user and the services to which each user has access privileges. The primary security task of the network infrastructure is to enforce network access rules to control a user's ability to send and receive communication messages or packets. Thus, the network will filter packets to or from a user based on the type of service or data requested and whether the user is authorized to access the particular type of service or data. The filtering occurs at a low-level network layer responsible for controlling how a network device gains access to the network, for example, at the Media Access Control (MAC) layer, which typically resides immediately above the physical network layer, to prevent or minimize the possibility of a network device attaching to the networking system and sending and receiving network data in an attempt to breach network security. In contrast to current network practice, a device is not able to "see" or send any message that was not explicitly authorized.

Figure 3:
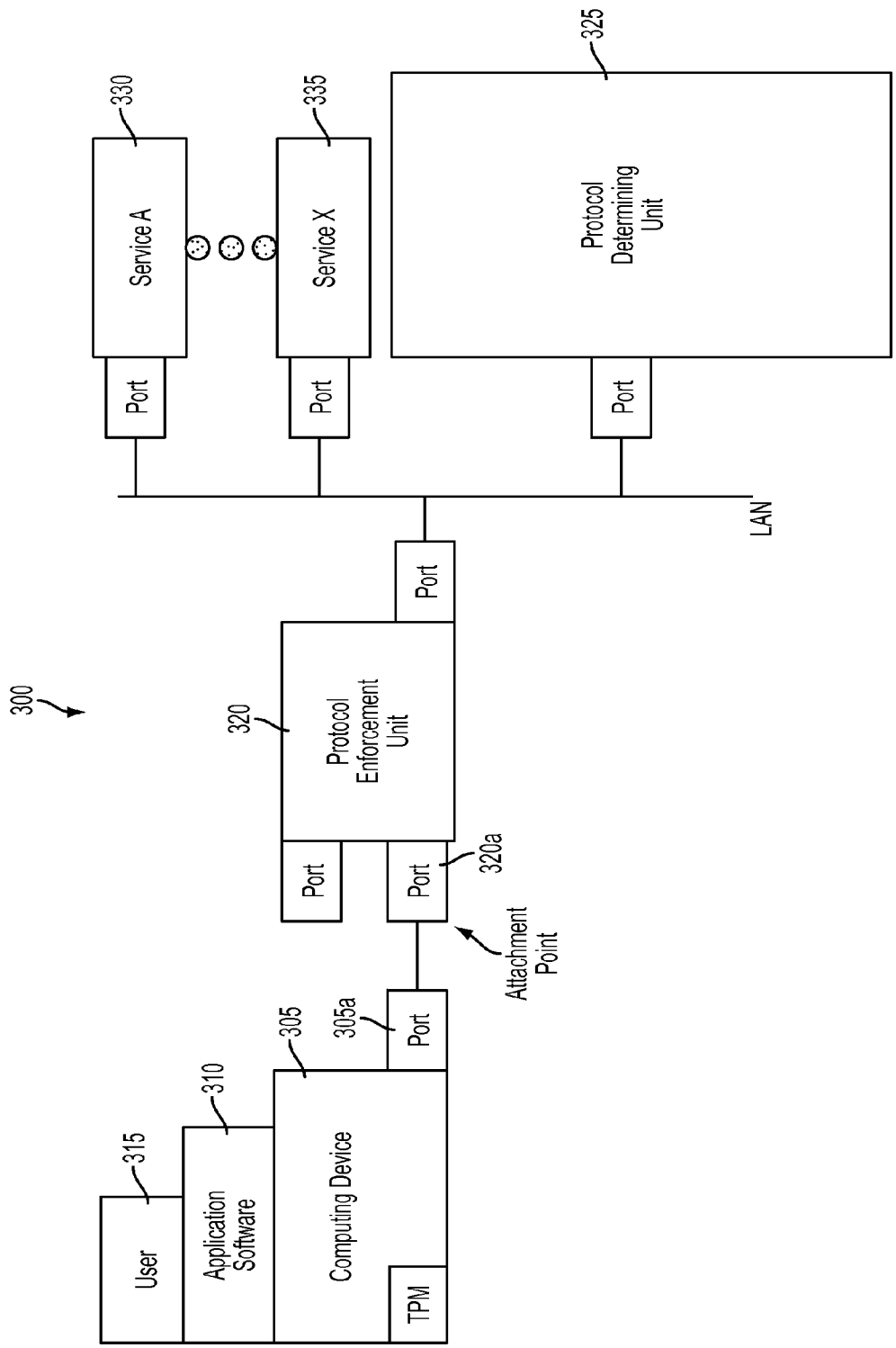
FIG. 3 is an illustration depicting a computer networking system according to at least one embodiment of the present invention.

As illustrated in FIG. 3, in at least one embodiment of the present invention, the computer networking system 300 includes a plurality of computing devices, for example computing device 305, which can be a user network device such as an external laptop computer, a desktop computer, or a Personal Digital Assistant (PDA). After being presented with the disclosure herein, those of ordinary skill in the relevant art will readily appreciate that such user network devices can include wireless mobile devices or any other viable devices for allowing a user to perform computing.

The computing device 305 includes application software 310 which a user 315 utilizes to perform computing tasks such as drafting a word processing document and accessing various computing services provided by the computer networking system 300.

As illustrated in FIG. 3, the computer networking system 300 provides several network computing services to allow the user 315 to complete various computing tasks. For example, service A 330 can be a document printing service, and service X 335 can be a file transfer service utilizing the File Transfer Protocol, for example.

The plurality of computing devices, for example, user network devices such as external laptop computers, desktop computers, or Personal Display Assistants (PDA's), and wireless mobile devices, are adapted to communicate with a plurality of protocol enforcement units such as protocol enforcement unit 320, for example, which could be embedded within a network access device such as an Ethernet switch or a wireless access point. After being presented with the disclosure herein, one of ordinary skill in the relevant art would appreciate that the present invention is not limited to the above-identified devices. For example, the protocol enforcement unit 320 may also be a router in at least one embodiment of the present invention.

In at least one embodiment, port 305a of the computing device 305 attaches or connects to port 320a, which serves as an attachment point to the protocol enforcement unit 320. In at least one embodiment of the present invention, the computing device 305, for example, communicates with the protocol enforcement unit 320 wirelessly, that is, establishes a wireless connection to the computer networking system 300. Similarly, a protocol determining unit 325 is communicatively coupled to the plurality of protocol enforcement units.

In at least one embodiment of the present invention, the protocol determining unit 325 is adapted to interpret access privileges relating to users and services (for example, printing or file transfer), for example. The protocol determining unit 325 can be further adapted to interpret data access privileges relating to users, services, data, and/or trustworthiness of network devices, as will be described in further detail herein below. In at least one embodiment of the present invention, for example, the protocol determining unit 325 may also interpret access privileges relating to document services such as printing provided by service A 330.

After being presented with the disclosure herein, one of ordinary skill in the art would recognize that the present invention is not necessarily limited to the above-identified interpreting. For example, in at least one embodiment, the protocol determining unit is further adapted to interpret data access privileges relating to user roles and/or services (for example, document services) allowed for the roles. In such an embodiment, a privilege is granted based on a user being a member of a particular group, for example. Similarly, a privilege can be granted based on a user having a particular position, for example, providing data access to all vice-presidents of a particular corporation. It should also be noted that the protocol determining unit may also be adapted to interpret data access privileges relating to trustworthiness of network devices. The interpreting of privileges can be further guided by general policies that are specific to an organization, for example, only company laptops can access a Data Retrieval Service.

Regardless of the interpretations, the protocol determining unit 325 provides the protocol enforcement unit 320 with determinations of network access based on the interpretations. The determinations can be in the form of rules for permitting the sending and receiving of messages or packets at the lower layers such as the network or MAC layers. The protocol enforcement unit 320 is adapted to enforce the determinations of network access provided by the protocol determining unit 325. In at least one embodiment, the protocol enforcement unit is adapted to monitor and filter network message traffic based on network access rules interpreted from access privileges relating to users and services.

Therefore, when the user 315 utilizes the computing device 305 to connect to the computer networking system 300, the protocol enforcement unit 320 only allows the computing device 305 to access the Service A 330, for example, should the protocol determining unit 325 determine that the user 315 or computing device 305 only has access to such service. Since a user can only send/receive messages for allowable services, a Private Virtual Network is created for each user.

In at least one embodiment, the protocol enforcement unit is implemented using Soekris Engineering net4801 Embedded computers. In such an embodiment, the computers are equipped with a 266 Mhz 586 class Geode Central Processing Unit (CPU), has 10/100 Ethernet ports, 128 M SDRAM main memory, 1 mini-PCI slot and one Compact Flash Interface for program and data storage. The unit can be embedded in network access devices such as network interface cards, Ethernet switches, or wireless access points.

Figure 3A:
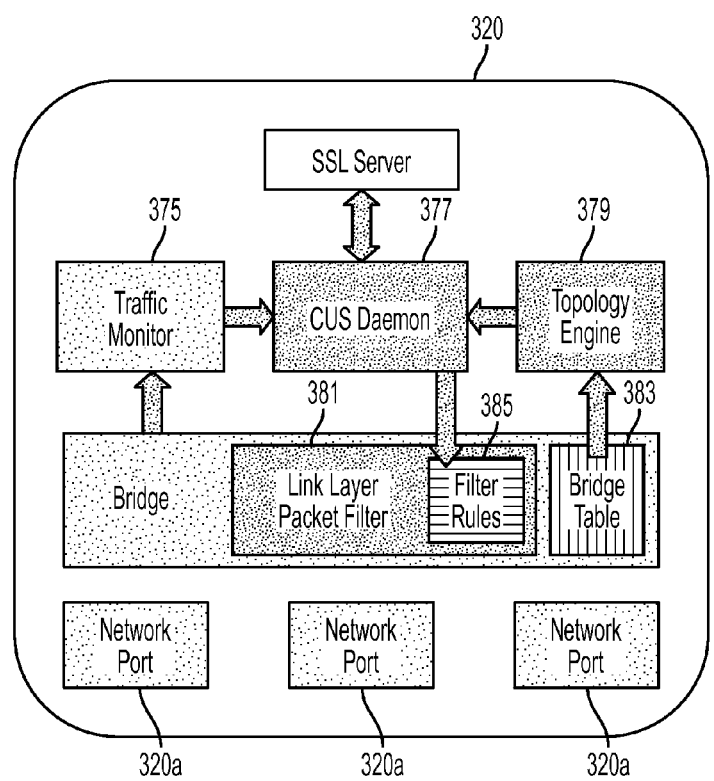
FIG. 3A is an illustration of the software modules of an exemplary protocol enforcement unit according to at least one embodiment of the present invention.

An embodiment such as the embodiment described above utilizes the Linux 2.6.6 kernel, for example. The Unit also utilizes a filtering tool such as "ebtables" that is used to specify the filtering rule sets to enforce the access privileges, In such an embodiment, the Protocol Determining Unit sends the network access rules in the form of ebtable filtering rules. As illustrated in FIG. 3A, in addition to the Linux kernel, the Protocol Enforcement Unit 320 also includes a traffic monitor module 375, collaborative ubiquitous security daemon 377, an SSL client (not shown in FIG. 3) and topology engine 379.

Link layer packet filter module 381 of the Unit can be implemented using the bridge function of the Linux kernel. The module manages forwarding of link layer data frames between the local ports of the Unit. The decision of which port to forward a frame is based on the connectivity information stored in the kernel's bridge table 383. The bridge table module 383 is updated periodically by the IEEE 802.1d bridging protocol and prunes MAC addresses that have not been observed and updates the table with new MAC addresses "seen" on incoming Ethernet frames. The module also supports the packet filtering functions. The above-referenced ebtables software is the front end of the filtering function which manages the filtering rules 385 of the packet filtering function. The name ebtables refers to Ethernet Bridge Tables and is a user-space tool used to set up and maintain the tables of Ethernet frame filtering rules in the Linux kernel. The filtering examines the Ethernet frame fields and can transparently filter network traffic passing through the bridge. In addition to basic filtering, the ability to alter the Ethernet frame MAC addresses is provided, in addition to implementing a "brouter" function, which bridges some frames/packets or routes some of the other packets. For example, these functions are useful for capturing and containing unauthorized messages from a network device.

Referring again to FIG. 3, the interpreting performed by the protocol determining unit 325 and the enforcement performed by the protocol enforcement unit 320 are intended to effect network layers responsible for controlling how a network device gains access to the network, for example, at the Media Access Control layer, which is also known as layer 2. As interpreting and enforcement occur at a low-level network layer, the possibility of a network device attaching to the computer networking system 300 and sending and receiving network data in an attempt to breach network security is minimized or prevented.

Figure 4:
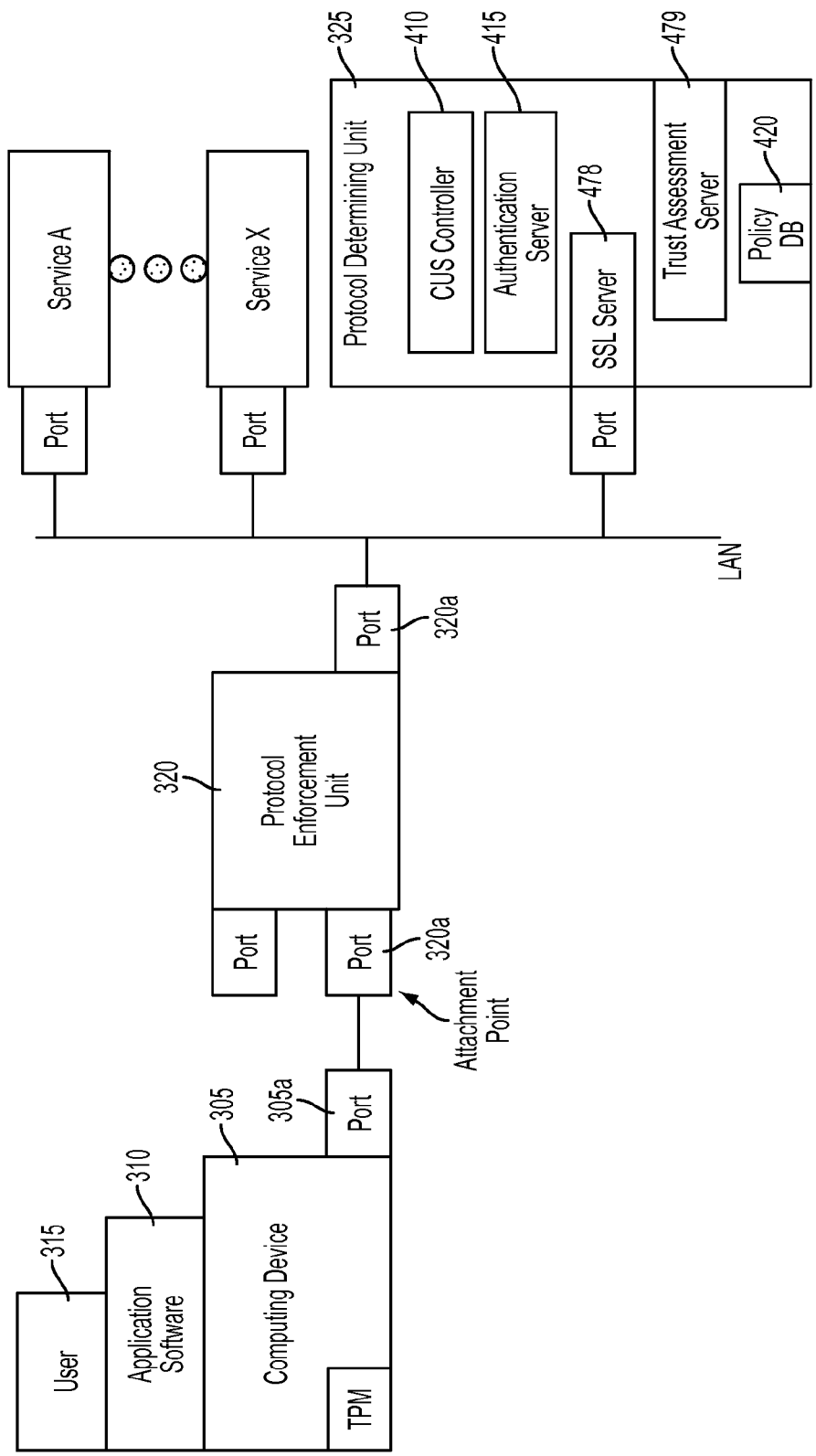
FIG. 4 is a more detailed illustration depicting a computer networking system according to at least one embodiment of the present invention.

Referring to FIG. 4, in at least one embodiment, the protocol determining unit 325 includes Access Determination Controller 405, Collaborative Ubiquitous Security (CUS) Controller 410, user authentication server 415, and policy database 420. In at least one embodiment, the protocol determining unit 325 further includes a network device trust-assessment server. Each of the components within the protocol determining unit 325 is communicatively coupled in at least one embodiment of the present invention.

After being presented with the disclosure herein, one skilled in the relevant art will realize that the present invention can include a wide variety of configurations. For example, although each of the components identified above are illustrated as being a part of the protocol determining unit, the components may also be separate components.

In at least one embodiment, before access privileges are determined as described in the text accompanying FIG. 3, the authentication server 415 authenticates the user 315. For example, in at least one embodiment of the present invention, a username, a password, and/or a certificate is verified by the authentication server 415. Other identification methods such as a biometric measurement may also be employed. For example, the authentication server may be based on a Radius server.

Policy database 420 includes or stores network policy information, that is, allowed privileges relating to users, services, data, and/or devices, for example. For instance, the policy database 420 may serve as a "lookup table" in which User 315 is noted as having access to service A 330. Similarly, the policy database 420 may indicate that User 315 has access to the printing service but can only print particular data, for example, a particular document. Further still, the policy database 420 may indicate that the User 315 has access to print the particular document only when the User 315 is accessing the computer networking system 300 via a particular device, for example the user's company issued laptop computer.

Figure 5:
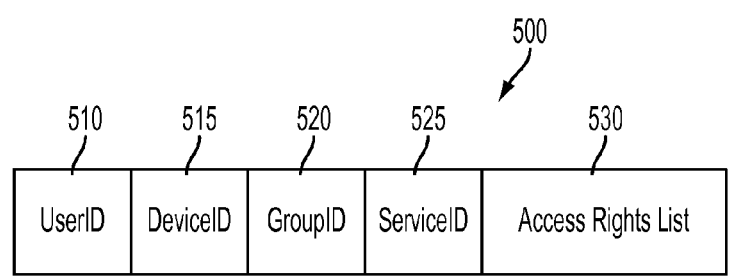
FIG. 5 is an illustration of an information table utilized according to at least one embodiment of the present invention.

As illustrated in FIG. 5, privileges relating to users, services, and data, etc., may be stored in a record 500 in at least one embodiment of the invention. Record 500 includes user id field 510, device id field 515, group id field 520, service id field 525, and access rights list field 530.

The user id field 510 identifies a particular user. The device id field 515 identifies a particular device. The group id field 520 identifies a particular group of which the user may be a member. The service id field 525 identifies a particular service. The access rights list field 530 indicates access rights or privileges related to the particular user identified by user id field 510, on the device identified by the device id field 515 in relation to a particular service identified by the service id field 525, for example.

Referring again to FIG. 4, the policy database 420 may be manually populated by an administrator or automatically populated, that is, access privileges related to users and services, for example, can be dynamically stored based on previous entries in at least one embodiment of the present invention. The data base entries can be dynamically generated in response to a user request for a particular service or as a result of interpreting general policy.

The access determination controller 405 communicates with the policy database 420 to interpret access privilege information. The determination controller then converts the results of access privilege interpretation into network access rules using a rule generator to allow the protocol enforcement unit 320 to enforce the access privileges through message/packet filtering. That is, the access determination controller 410 functions to convert or translate data access or service access privileges into rules that are privileges or rights to send and receive messages to specific destinations or from specific destinations. For example, the above may be specified as ebtable formatted rules. The Access Determining Controller then passes the access rules to the collaborative ubiquitous security controller.

The collaborative ubiquitous security controller 410 functions as the Protocol Determining Unit coordinator and the user interface for a system administrator to configure the security system. The rules or protocols are securely transmitted to the protocol enforcement units 320. For example, the secure transmission of rules can be accomplished by the SSL server 478 on the collaborative ubiquitous security controller 410 sending messages to each of the SSL servers on the protocol enforcement units, for example, protocol enforcement unit 320, thereby instructing the Units to incorporate the rules in their filtering function.

In at least one embodiment of the present invention, the collaborative ubiquitous security controller 410 can be implemented on a computer attached to a Local Area Network and hosts a Graphical User Interface, developed in the ".NET" framework, for an administrator or controller to control the Controller by sending commands such as to enable/disable the Controller features and to oversee the granting of access rights to network users. After logging into the collaborative ubiquitous security controller 410, an administrator enables the present invention, thereby activating the security features.

The activation is translated into an appropriate command which is transmitted by the SSL server on the collaborative ubiquitous security controller 410 to each of the SSL servers on the protocol enforcement units, for example, protocol enforcement unit 320, thereby instructing the Protocol Enforcement Units to enable or activate the present invention. The Administrator can add a new user and grant access to one or more of the services in the network. The Controller can also specify a port on one of the protocol enforcement units as the newcomer's attachment or connection point. The rule generator on the Access Determination Controller is invoked to generate rules to let the guest user access the services the user has been granted access to from the defined connection point.

For example, in at least one embodiment of the Protocol Determining Unit, the rule generator script is written in the Perl scripting language, and the Protocol Determining Unit's software maintains the Policy Database relating services, users, and network devices. For instance, the service data can include entries of the form: <service type (e.g., PRINTER, WEB SERVER), service name (e.g., a specific name HPLJ6400), IP address, MAC address, protocol(s), port(s)>.

Similarly, for the network devices, the following information can be maintained: <device's assigned name (e.g., SWITCH_001), the Internet Protocol (IP) address, MAC address, list of mapping of interface names to physical ports>.

For users, the following information can be maintained: <user's name (e.g. GUEST_001), IP, MAC, device name, port to which user connects, list of user's privileges (for example, services to which a user has access)>.

When the present invention is enabled, the services in the network are registered in the service portion of the policy database and appropriate rule parts are generated for the services. When a user is granted access to a service, a complete set of rules is created by combining the service rule specification details along with the user information. Two sets of rules are created—one for all of the protocol enforcement units and another exclusively for the protocol enforcement unit to which the user is connected.

Trust Assessment server 479 can perform assessment of the trustworthiness of the network device, that is, authenticating the device from a trust assessment service available in the network, according to at least one embodiment of the present invention.

Figure 6:
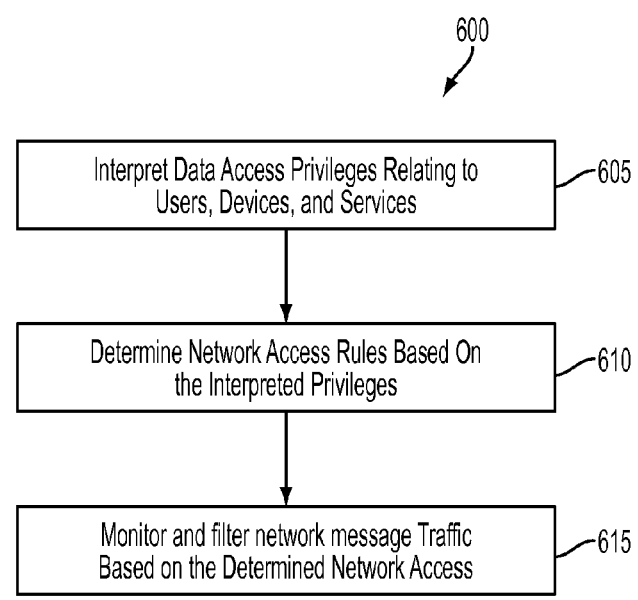
FIG. 6 is a flow diagram of the method performed according to at least one embodiment of the present invention.

The method of operation of the present invention will now be described in reference to FIG. 6. As illustrated in FIG. 6, in operation 605 of method 600, data access privileges relating to users, devices and services, for example, internal network services including services provided by fileservers and printers, are interpreted.

After being presented with the disclosure herein, however, one of ordinary skill in the relevant art will realize that the present invention can be employed with other types of services without departing from the scope and spirit herein. For example, the interpreting can also include interpreting data access privileges relating to users and remote services including webbrowsing, file transfer protocol services, telnet services, and secure shell protocol services.

Similarly, in at least one embodiment, interpreting access privileges relating to users and services includes interpreting data access privileges relating to users and document services including viewing, modifying, copying, storing, and printing.

Interpreting may include determining whether a particular user is allowed to access a particular service or data, for example. As previously explained, however, the present invention is not limited thereto. For example, in at least one embodiment, interpreting may include determining whether a particular user, on a particular device, has access to a particular service in reference to particular data such as a document to be printed, for example. It should also be noted that network message traffic patterns can be determined based on the interpreted data access privileges.

In operation 610, network access rules are determined based on the interpreted privileges. For example, the present invention may determine that a particular user has access to print a particular document. The user's network access rules are determined based on the privileges interpreted for the particular user and the service to be used.

In operation 615, network message traffic is monitored and filtered based on the determined network access rules. In at least one embodiment of the present invention, the monitoring and filtering includes a subsequent method such that the network device can only send and receive messages that are allowed from determining the network access rules based on the interpreted privileges after the user is authenticated.

As the interpreting, determining, monitoring, and filtering are performed at a network layer responsible for controlling how a network device gains access to the network, such as the Media Access Controller layer (or some other layer immediately above the physical network layer), network security breaches can be prevented or minimized.

The present invention also provides the added benefit of detecting a network intrusion incident based on the interpreting, determining, monitoring, and filtering described above.

In at least one embodiment, an initial operation is performed before the interpreting of access privileges. For example, the interpreting of access privileges relating to users and services can further include verification of successful authentication of the user identity from an authentication service available in the network and interpreting access based in part on the results of the authentication. In such an initial operation, the network device can only send and receive messages that are necessary for the user to be authenticated before interpreting data access privileges, thereby minimizing or preventing a device from "listening" on the network. In at least one embodiment, authenticating relates to verifying a username, password, biometric and/or certificate.

Similarly, the interpreting of data access privileges relating to users and services can further include assessment of the trustworthiness of the network device, that is, authenticating the device from a trust assessment service available in the network. For example, a chip such as a Trusted Platform Module, can be embedded within the particular device to be authenticated. The chip performs measurements on the device to measure the hardware configuration, for example, an external disk drive, and low-level operating software, for example, the BIOS. For instance, hardware and software measurements can be recorded for a particular user using this device. As part of the device authentication procedure, the device would be required to report its measured values. If the actual measurements do not correspond to the recorded information, then the device is not trustworthy. In such an instance, device authentication for the particular device fails, and the device may be denied access to some services on the network.

Figure 6A:
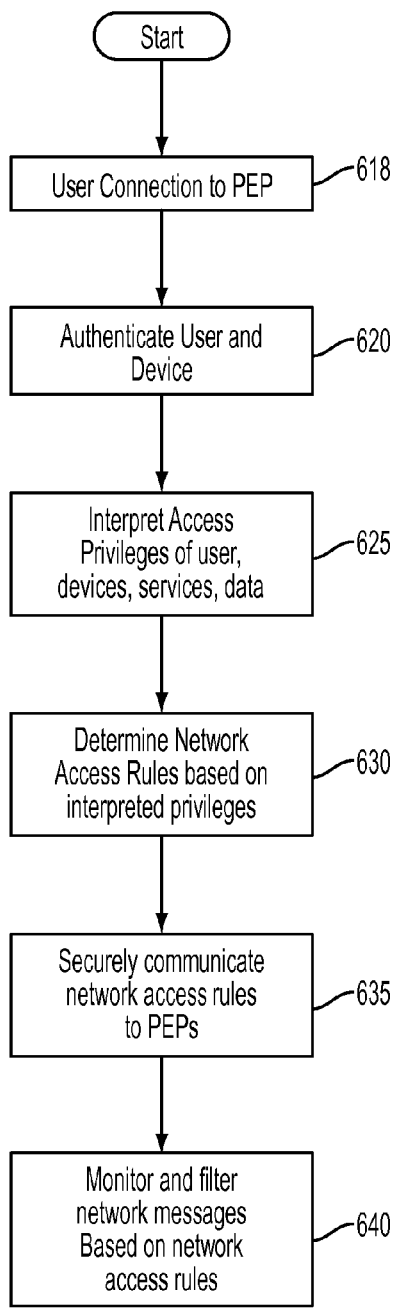
FIG. 6A is a flow diagram of a method performed according to a specific embodiment of the present invention.

As illustrated in FIG. 6A, operations included in a method of a specific embodiment of the present invention are illustrated.

In operation 618, a user connects to a protocol enforcement unit. For example, a user utilizes his or her laptop computer to connect to the Protocol Enforcement Unit 320 illustrated in FIG. 3, for example.

In operation 620, the user and the device with which the user connects to the Protocol Enforcement Unit 320, for example, are authenticated.

In operation 625, access privileges of users, devices, services, and/or data are interpreted.

In operation 630, network access rules based on interpreted privileges are determined.

In operation 635, the network access rules are securely communicated to the Protocol Enforcement Units.

Finally, in operation 640, network messages are monitored and filtered based on network access rules.

Figure 7A:
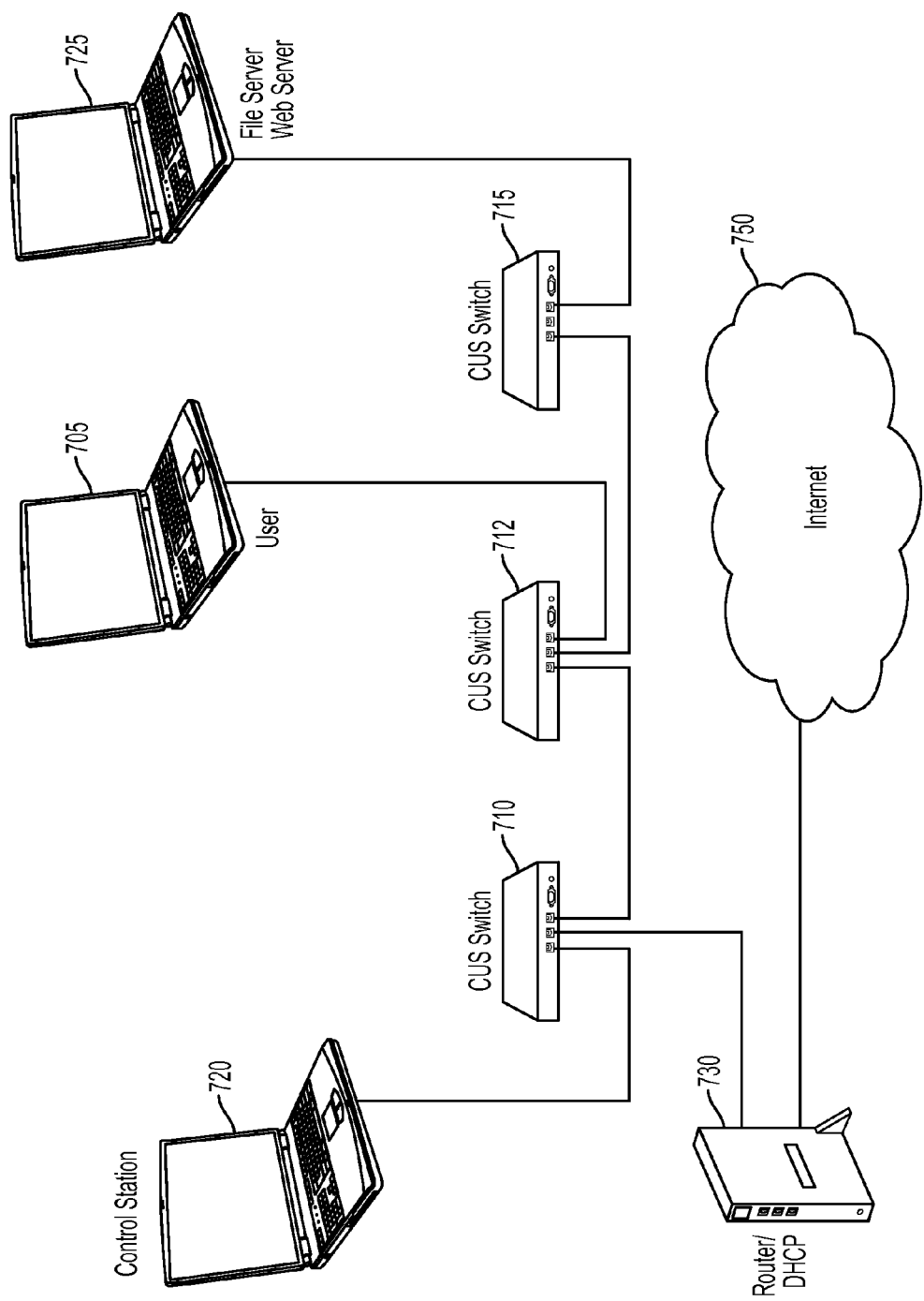
FIG. 7A is an illustration depicting a computer networking system in which the present invention is disabled according to at least one embodiment of the present invention.

FIG. 7A is an illustration depicting a computer networking system 600, which is connected to the Internet 750 via router 730. In the computer networking system 700, the present invention is disabled according to at least one embodiment of the present invention. When the present invention is disabled, that is, internal security provided by switches 710-715 is disabled, a guest user 705 can run a port scanner software such as "nmap," for example, and gather information about the open ports on the network. Switches 710-715, control station 720, and service providing devices such as file server 725 can be "seen" by any user. That is, message data, Internet Protocol addresses, MAC addresses and ports of the switches and devices can be seen by the user.

Figure 7B:
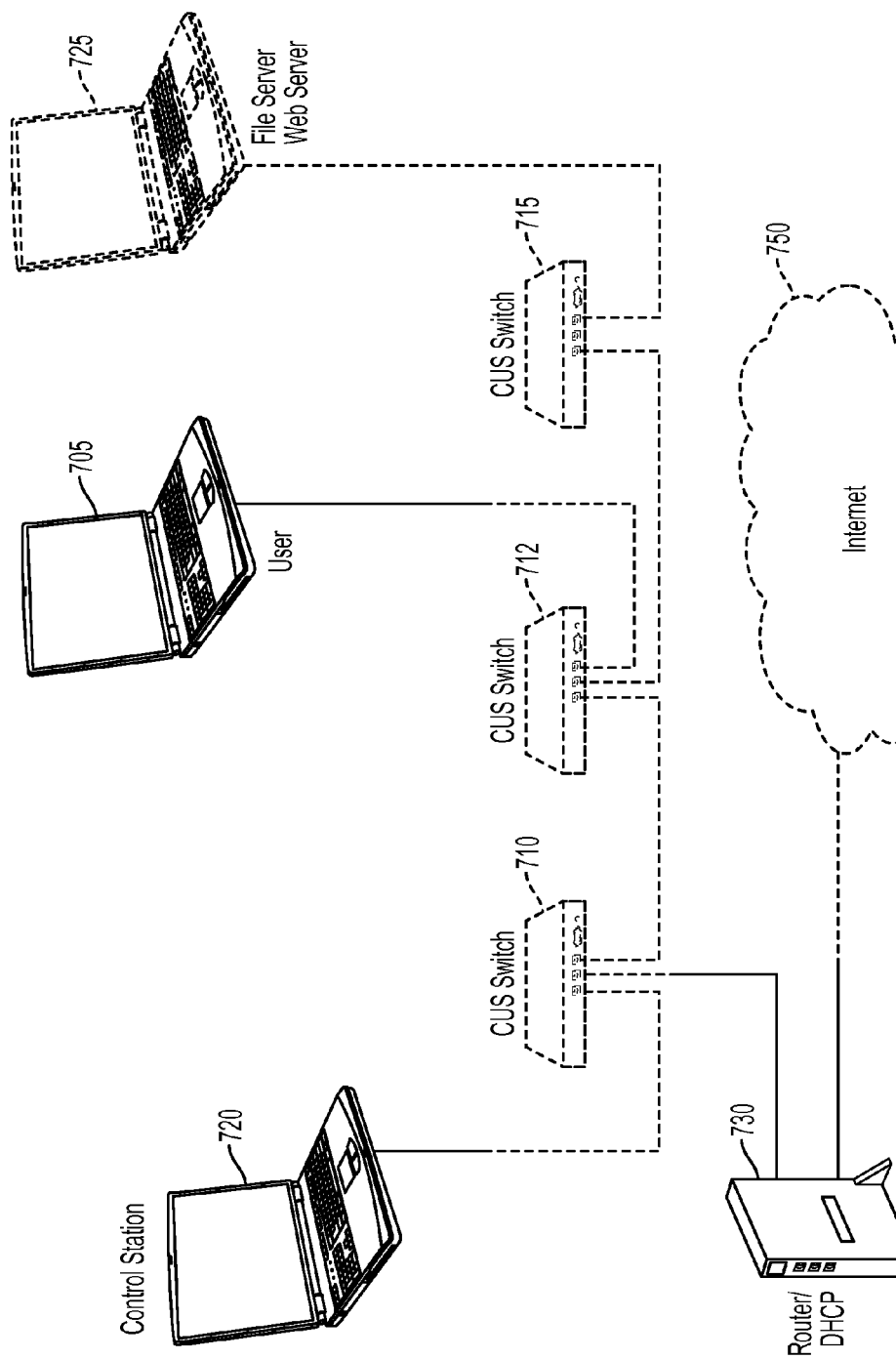
FIG. 7B is an illustration depicting a computer networking system in which the present invention is enabled according to at least one embodiment of the present invention.

As illustrated in FIG. 7B, after the present invention is enabled, the user 705 is unable to "see" any message data, Internet Protocol addresses, MAC addresses and ports of the switches 710-715, host computers, and service providing devices. The port scanner referenced in the example presented above will not detect any open ports other than those permitted when the present invention is enabled. The user 705 can only detect the control station 720 that will require authentication for any further communication.

Figure 7C:
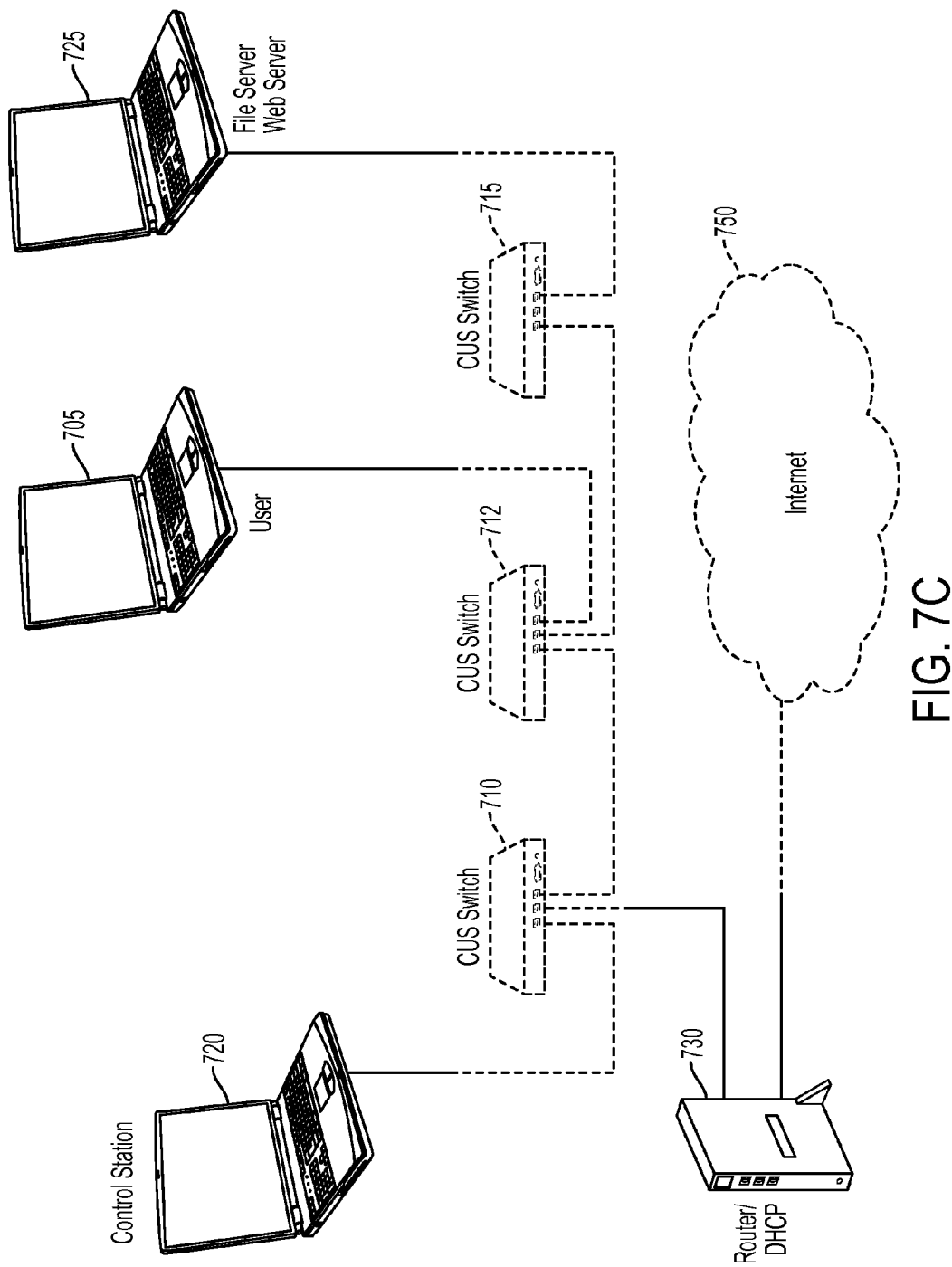
FIG. 7C is an illustration depicting a computer networking system in which a user has been authorized to access a computer networking system according to at least one embodiment of the present invention.

As illustrated in FIG. 7C, after authentication, the user 705 is granted access to a specific set of services provided by file server 725, for example, from a specific connection point. Once the control station has issued the appropriate commands to the network, the user 705 can see only those ports on the service providing devices corresponding to the services to which the user has access. Other services, ports, and switches are undetected, thereby preventing or minimizing "listening" on the network and thereby enhancing network security at a low-level such as the Media Access Control (MAC) level.

After being presented with the disclosure herein, one of ordinary skill in the art will realize that the present invention can be implemented in software, firmware, and/or a combination thereof. Program code according to the present invention can be implemented in any viable programming languages such as C, C++, or any other viable high-level programming language, or a combination of such a high-level programming language and a low-level programming language such as Assembler, for example.

The present invention can also be in the form of a computer readable medium encoded with processing instructions for controlling a computer to implement the methods described herein according to embodiments of the present invention.

The present invention should not be limited to the embodiments described herein. After being presented with the disclosure herein, those of ordinary skill in the art would appreciate that changes may be made to the disclosed embodiments without departing from the spirit and scope of the present invention.

What is claimed is:

1. A method for enhancing network security of a computer network, comprising:
configuring one or more computing devices responsible for device address based access control to the computer network, to execute:
after authentication of a user and/or a network device to access the computer network, interpreting service and/or data access privileges relating to the user and/or the network device into network access rules for privileges or rights to send and receive messages to destinations or from destinations to access a service and/or data available on the accessed computer network;
and
incorporating data that pertains to the network access rules relating to access by the user and/or the network device to the service and/or data on the accessed computer network, into device address based filtering rules enforced at a Media Access Control (MAC) layer to control at the MAC layer monitoring and filtering of network message traffic for the user and/or the network device to access the service and/or data on the accessed computer network.

2. The method of claim 1, wherein the MAC layer is immediately above the physical network layer.

3. The method of claim 1, further comprising detecting a network intrusion incident based on said interpreting, determining, monitoring and filtering.

4. The method of claim 1, wherein in the authentication, the network device sends and receives messages necessary for the user and/or the network device to be authenticated before the interpreting of the service and/or data access privileges.

5. The method of claim 1, wherein said authenticating relates to verifying a username, password, biometric and/or certificate.

6. The method of claim 1, wherein said service and/or data access privileges relate to internal network services including services provided by fileservers and printers.

7. The method of claim 1, wherein said service and/or data access privileges relate to remote services including web browsing, file transfer protocol services, telnet services, and secure shell protocol services.

8. The method of claim 1, wherein said service and/or data access privileges related to document services including viewing, modifying, copying, storing, and printing.

9. The method of claim 1, further comprising, before said interpreting, dynamically storing said service and/or data access privileges relating to users and/or network devices.

10. The method of claim 1, wherein said interpreting further includes:
interpreting service and/or data access privileges relating to user roles and services allowed for the roles.

11. The method of claim 1, wherein said determining of network access rules further includes determining the network message traffic patterns based on the interpreted service and/or data access privileges.

12. The method of claim 1 wherein the interpreting of service and/or data access privileges relating to user and/or the network device further comprises verification of successful authentication of the user identity and/or authentication of the network device from an authentication service and interpreting the user's and/or network device's service and/or data access based in part on the results of the authentication.

13. The method of claim 1, wherein the interpreting of service and/or data access privileges relating to the user and/or the network device further comprises assessment of trustworthiness of the network device from a trust assessment service.

14. A method for enhancing network security on a computer network, comprising:
after authentication of a user and/or a network device to access the computer network,
accessing data pertaining to service and/or data access privileges relating to the user and/or the network device and converting the accessed data into network access rules for privileges or rights to send and receive messages to destinations or from destinations to access a service and/or data available on the accessed computer network and incorporating said network access rules into device address based filtering rules enforced at a Media Access Control (MAC) Layer to control at the MAC layer monitoring and filtering of network message traffic for the user and/or the network device to access the service and/or data on the accessed computer network.

15. A computer network system providing enhanced security on a computer network, comprising:
a protocol determining device including a computer processor that, after authentication of a user and/or a network device to access the computer network, interprets service and/or data access privileges relating to the user and/or the network device into network access rules for privileges or rights to send and receive messages to destinations or from destinations to access a service and/or data available on the accessed computer network;
a plurality of protocol enforcement devices that enforce determinations of network access rules for the service and/or data; and
a plurality of network devices that communicate with the plurality of protocol enforcement devices, wherein said enforcement of the network access rules relating to access by the user and/or the network device to the service and/or data on the accessed computer network execute at a Media Access Control (MAC) layer responsible for device address based filtering to control at the MAC layer monitoring and filtering of network message traffic for the user and/or the network device to access the service and/or data on the accessed computer network.

16. The system of claim 15, wherein said protocol determining device is further adapted to interpret service and/or data access privileges relating to user roles.

17. The system of claim 16, wherein said protocol determining device is further adapted to interpret service and/or data access privileges relating to document services.

18. The system of claim 17, wherein said service includes services relating to printing.

19. The system of claim 16 wherein said protocol determining device is further adapted to interpret service and/or data access privileges relating to trustworthiness of network devices.

20. The system of claim 16, wherein said service includes services relating to file transfer.

21. The system of claim 15, wherein said network devices include external laptop computers, desktop computers, or PDAs.

22. The system of claim 15, wherein said network devices include wireless mobile devices.

23. The system of claim 15, wherein said network devices communicate with the protocol enforcement devices via wireless connection.

24. The system of claim 15, wherein said protocol determining device implements a user authentication server, a network device trust-assessment server, a collaborative ubiquitous security controller, and a policy database.

25. The system of claim 15, wherein said protocol enforcement devices are embedded in other network access devices such as network interface cards, Ethernet switches or wireless access points.

26. A network apparatus for enhancing network security, comprising:

a device adapted to monitor and filter network message traffic based on network access rules for privileges or rights to send and receive messages to destinations or from destinations, the network access rules interpreted from service and/or data access privileges relating to users and/or network devices for accessing a service and/or data available on accessed computer network after authentication of a user and/or a network device to access the computer network;

wherein said monitoring and filtering for network access rules relating to access by the user and/or the network device to the service and/or data on the accessed computer network occurs at a Media Access Control (MAC) layer responsible for device address based filtering to control at the MAC layer monitoring and filtering of the network message traffic for the user and/or the network device to access the service and/or data on the accessed computer network.

* * * * *